United States Patent [19]

Brüggendick et al.

[11] Patent Number: 4,960,447
[45] Date of Patent: Oct. 2, 1990

[54] REACTOR WITH MOVING LAYER FOR THE REMOVAL OF UNDESIRABLE GASEOUS COMPONENTS FROM GASES

[75] Inventors: Hermann Brüggendick, Hunxe; Raimond Weber, Witten; Ekkehard Richter, Essen-Kettwig; Berthold Knoppik, Essen, all of Fed. Rep. of Germany

[73] Assignee: Bergwerksverband GmbH, Essen, Fed. Rep. of Germany

[21] Appl. No.: 378,205

[22] PCT Filed: Oct. 28, 1987

[86] PCT No.: PCT/EP87/00639
    § 371 Date: Jun. 20, 1989
    § 102(e) Date: Jun. 20, 1989

[87] PCT Pub. No.: WO88/03434
    PCT Pub. Date: May 19, 1988

[30] Foreign Application Priority Data

Nov. 12, 1986 [DE] Fed. Rep. of Germany ....... 3638611

[51] Int. Cl.$^5$ .............................................. B01D 53/08
[52] U.S. Cl. ........................................ 55/390; 55/474; 55/479
[58] Field of Search ................. 55/34, 60, 79, 181, 55/390, 474, 479; 210/268

[56] References Cited

U.S. PATENT DOCUMENTS

| | | | |
|---|---|---|---|
| 1,895,601 | 1/1933 | Beuthner | 55/474 X |
| 2,493,218 | 1/1950 | Bergstrom | 55/390 X |
| 2,780,310 | 2/1957 | Schaub | 55/79 X |
| 2,834,119 | 5/1958 | Schaub | 55/474 X |
| 3,716,969 | 2/1973 | Maeda | 55/390 |
| 3,717,976 | 2/1973 | Gappa et al. | 55/79 X |
| 4,292,054 | 9/1981 | Noack et al. | 55/390 X |
| 4,308,036 | 12/1981 | Zahedi et al. | 55/479 X |
| 4,333,751 | 6/1982 | Iwamura et al. | 55/479 X |
| 4,601,736 | 7/1986 | Fijiwara et al. | 55/479 |
| 4,670,226 | 6/1987 | Faruyama et al. | 55/390 X |
| 4,725,290 | 2/1988 | Ohlmeyer et al. | 55/479 X |
| 4,744,804 | 5/1988 | Furuyama et al. | 55/390 X |

FOREIGN PATENT DOCUMENTS

| | | | |
|---|---|---|---|
| 0057468 | 8/1982 | European Pat. Off. | 55/390 |
| 54-151554 | 11/1979 | Japan | 55/79 |
| 55-139829 | 11/1980 | Japan | 55/390 |
| 0856512 | 8/1981 | U.S.S.R. | 55/390 |
| 1402543 | 8/1975 | United Kingdom . | |

*Primary Examiner*—Robert Spitzer
*Attorney, Agent, or Firm*—Herbert Dubno

[57] ABSTRACT

A reactor having a moving layer for the removal of undesirable components for gases has an upright moving-adsorber chamber flanked by jalousie arrays of shutters laterally separating that chamber from a gas inlet chamber and a gas outlet chamber communicating through the jalousies with the adsorbent chamber. The gas inlet and gas outlet chambers, which extend over substantial portions of the height of the adsorbent chamber, are provided with the gas inlet and outlet respectively and are so oriented that the flow of gas through the adsorbent chamber is diagonal across the downward flow of the adsorbent supplied at the top of the adsorbent chamber and removed at the bottom thereof.

3 Claims, 1 Drawing Sheet

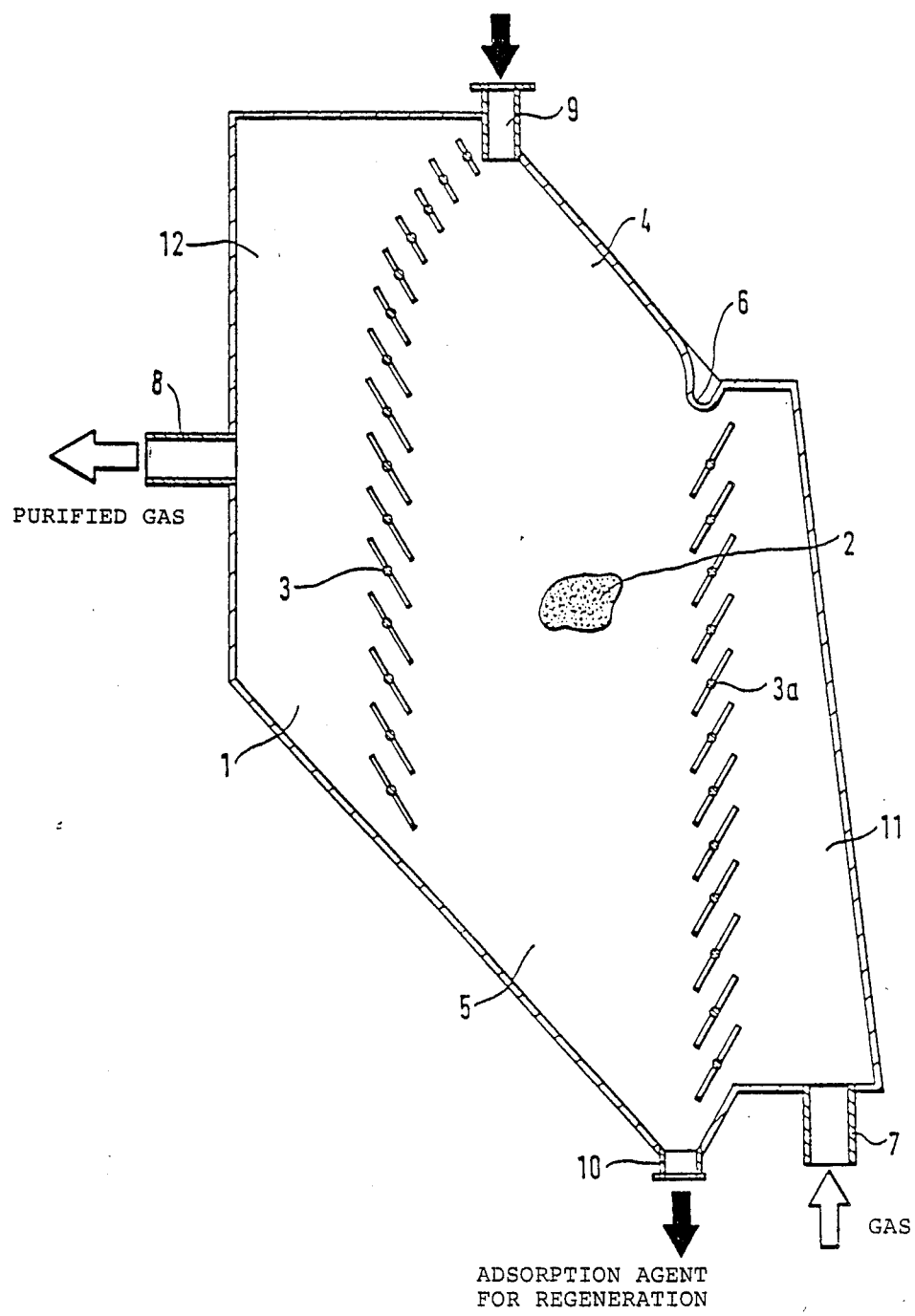

REACTOR WITH MOVING LAYER FOR THE REMOVAL OF UNDESIRABLE GASEOUS COMPONENTS FROM GASES

CROSS REFERENCE TO RELATED APPLICATIONS

This application is a national phase of PCT/EP 87/00639 filed Oct. 28, 1987 and based upon a German national application P36 611.1 of Nov. 12, 1986 under the International Convention.

Our present invention relates to a reactor with a moving layer for the removal of undesirable gaseous components from gases wherein the gases are lead diagonally through a layer of granular adsorption agents traveling downwardly, whereby the moving layer is separated by shutters from the gas chambers and the reactor is narrower in the proximity of the inlet and the outlet for the adsorption agents, so that a distribution chamber and a discharge chamber are formed.

BACKGROUND OF THE INVENTION

It is known to purify gases with the aid of reactors having a moving layer and wherein the gas flows diagonally. In the German open application 29 11 721, for instance, a process for the removal of sulfur oxides and nitrogen oxides is disclosed, wherein the exhaust gases are passed diagonally through a reactor with a moving layer of granular, carbonaceous adsorption agents, traveling from the top to the bottom. The adsorption agent is supplied through a distribution chamber, which does not have shutters, located at the top of the reactor, to the moving layer traversed by gas, which is laterally limited by shutters through which the exhaust gas can enter, respectively exit. The adsorption agent travels slowly downwardly, into a discharge chamber, which again is not limited by shutters. The cone-shaped chamber which are filled with the adsorption agent, are not traversed by the exhaust gas. The more compact the build of the adsorber, i.e. the higher the ratio of the bed depth to the bed height, the higher becomes the ratio of the space which is not traversed by gas to the active adsorber volume.

OBJECTS OF THE INVENTION

It is the object of the present invention to avoid dead flow volumes particularly at the bottom and the top of a moving-layer reactor.

This object is attained according to the invention through the characteristics defined in claim 1. This object is attained according to the invention by additionally forming the distribution chamber and the discharge chamber with shutters so that the gas chambers extend over the entire area of the shutter.

According to the invention, on one side of the distribution chamber a gas- and adsorption-agent guide is provided. The shutters in the area of the distribution chamber can be arranged along an arc of a circle whose radius corresponds to the bed depth.

In the traveling-layer reactor of the invention, the distribution- and discharge chambers are integrated into the reactor volume. As a result, the volume of the reactor can be considerably reduced in comparison to the state of the art. Since the entire moving layer is uniformly traversed by the gas flow, in the case of exothermic reactions the heat can be extracted everywhere. In this way, no undesirable temperature increases occur at any point of the moving layer.

On one side of the distribution chamber, a gas- and adsorption agent guide is provided, which prevents turbulence and related marginal currents.

In a preferred embodiment, the shutters are arranged along an arc of circle with a radius corresponding to the bed depth. As a result, in the entire area of the distribution chamber, equal flow pathes for the gas are available.

BRIEF DESCRIPTION OF THE DRAWING

The above and other objects, features and advantages of the present invention will become more readily apparent from the following description, reference being made to the accompanying drawing, the sole FIGURE of which is a vertical section through an apparatus in accordance with the invention.

SPECIFIC DESCRIPTION

As can be seen from the drawing, in a moving-layer reactor 1, a traveling layer 2 of adsorptive agents is formed which is guided through shutters 3, 3a in respective jalousies. The adsorptive agent is fed to a distribution chamber 4 by an adsorptive-agent supply inlet 9. It travels through the reactor into a discharge chamber 5 and is evacuated through an adsorptive-agent outlet 10. A gas is directed via a pipe 7 into the gas chamber 11 and flows diagonally to the traveling layer 2 through the adsorptive agent and leaves the moving-layer reactor 1 through the gas chamber 12, via a pipe 8. Through the shutters 3, 3a, in the area of the distribution chamber 4 and the discharge chamber 5, these chambers are also traversed by the gas. Via a gas and adsorbent guide member 6, turbulence and related boundary flows of the gas in the region of the distribution compartment 4 can be avoided. The shutters 3 in the area of the distribution chamber 4 are arranged in an arc of circle with a radius corresponding to the depth of the bed.

COMPARATIVE EXAMPLES

A moving-layer reactor according to the state of the art has the following dimensions:

| | |
|---|---|
| Height of the traveling layer | 7.50 m |
| Height of the distribution chamber | 1.35 m |
| Height of the discharge chamber | 1.35 m |
| Total height | 10.20 m |
| Bed depth | 2.00 m |
| Bed width | 2.00 m |

The following volumes result therefrom:

| | |
|---|---|
| Moving layer | 30.0 m$^3$ |
| Distribution and discharge chamber | 3.6 m$^3$ |
| Total volume | 33.6 m$^3$ |

The reactor with the moving layer has this way an effective reactor volume of 30.0 m$^3$. 3.6 m$^3$ of adsorption agent are located in the area of the dead flow volume.

EMBODIMENT EXAMPLE

When in the case of the moving-layer reactor of the invention the same effective reactor volume of 30 m$^3$ has to be achieved, the following reduced dimensions result:

| | |
|---|---|
| Height of the traveling layer | 6.60 |
| Total height | 9.30 m | which means that the volume and the overall dimensions of the moving-layer reactor according to the invention can be reduced by approximately 10%, when the same reaction or the same separation degree is to be achieved.

We claim:

1. A reactor for the removal of a component from a gas stream, comprising:

means defining an upright adsorbent chamber formed at an upper end with an inlet for a granular adsorbent for said component and below said inlet with a distribution compartment, distributing said adsorbent over a horizontal cross section of said adsorbent chamber, an adsorbent outlet at a lower end of said adsorbent chamber, and means for guiding adsorbent to said outlet, said adsorbent inlet and said adsorbent outlet being horizontally offset from one another, whereby granular adsorbent passes in a moving body from said adsorbent inlet to said adsorbent outlet downwardly and laterally;

means on one side of said adsorbent chamber and extending upwardly from said adsorbent outlet along said adsorbent chamber defining a first gas chamber separated from said adsorbent chamber by an array of horizontal shutters forming a first jalousie laterally permeable to gas;

means on an opposite side of said adsorbent chamber from said first gas chamber and extending downwardly from said adsorbent inlet defining a second gas chamber communicating with said adsorbent chamber through an array of horizontal shutters forming a second jalousie adapted to communicate with said adsorbent chamber and to be traversed by gas, said adsorbent chamber between said first and second jalousies being narrower in regions of said adsorbent inlet and said adsorbent outlet than at an intermediate location along a height of said adsorbent chamber so that said adsorbent chamber defines a depth of a bed of said adsorbent in said adsorbent chamber; and a gas inlet communicating with one of said first and second chambers and a gas outlet communicating with the other of said first and second gas chambers so that gas from said one of said chambers passes diagonally across and through a descending bed of said adsorbent in said adsorbent chamber to said other of said chambers, said gas chambers extending substantially the full heights of the respective jalousies.

2. The reactor defined in claim 1 wherein on a side of said distribution compartment a gas and adsorbent guide is provided.

3. The reactor defined in claim 1 wherein at least one of said jalousies in the region of said compartment is formed with its shoulders lying along an arc of a circle of a radius corresponding to said depth of said bed.

* * * * *